United States Patent [19]

Schülde et al.

[11] 4,127,562
[45] Nov. 28, 1978

[54] METHOD OF PREPARING COATINGS

[75] Inventors: Felix Schülde, Wulfen; Johann Obendorf, Dorsten; Volker Kulisch, Gladbeck, all of Germany

[73] Assignee: Veba-Chemie Aktiengesellschaft, Gelsenkirchen-Buer, Germany

[21] Appl. No.: 738,809

[22] Filed: Nov. 4, 1976

Related U.S. Application Data

[63] Continuation of Ser. No. 505,441, Sep. 12, 1974, abandoned.

[51] Int. Cl.$^2$ .................... C08L 63/00; C08G 59/06
[52] U.S. Cl. .................... 528/94; 260/33.4 EP; 260/33.6 EP; 260/830 TW; 526/273; 528/86; 528/408
[58] Field of Search ............ 260/47 EN, 49, 59, 2 N, 260/2 EP, 830 TW, 47 A, 2 BP; 526/273

[56] References Cited

U.S. PATENT DOCUMENTS

| | | | |
|---|---|---|---|
| 3,218,274 | 11/1965 | Boller et al. | 260/22 |
| 3,549,592 | 12/1970 | Godfrey et al. | 260/47 |
| 3,896,082 | 7/1975 | Rensmann et al. | 260/47 EN |

OTHER PUBLICATIONS

Handbook of Epoxy Resins, Lee & Neville, 1968 (chpt. 24, pp. 29-34).

*Primary Examiner*—Theodore E. Pertilla
*Attorney, Agent, or Firm*—Sprung, Felfe, Horn, Lynch & Kramer

[57] ABSTRACT

A method of producing coatings on the basis of two-component systems composed of 1,2-epoxy compounds having at least one 1,2-epoxy group in the molecule, plus cyclic amidines and the conventional paint additives, which are thermosetting at 100° to 200° C, the said method being characterized in that one uses as cyclic amidines imidazoline or tetrahydropyrimidine derivatives of the general formula

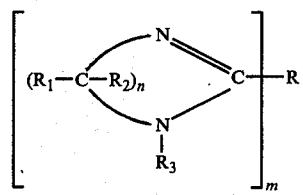

in which $n$ equals 2 or 3; $m$ equals 1 or 2; $R_1$, $R_2$ and $R_3$ are identical or different, and represent hydrogen, alkyl, aryl, aralkyl, cycloalkyl, heterocyclics, ether, theoether, halogen, —N(R)$_2$, nitro groups, keto groups, ester groups or carbonamide groups, and R represents alkyl, alkylene, an aryl, aralkyl, cycloalkyl or heterocyclic radical, substituted if desired with halogen, nitro groups, alkyl groups, alkoxy groups or amino groups, and, when $m$ equals 1, represents also hydrogen, a plurality of radicals being able to be joined, also by hetero atoms such as O, N or S, if desired.

5 Claims, No Drawings

METHOD OF PREPARING COATINGS

This is a continuation, of application Ser. No. 505,441, filed Sept. 12, 1974, abandoned.

BACKGROUND

The invention relates to a method of producing coatings on the basis of two-component systems consisting of 1,2-epoxy compounds, special cyclic amides and the commonly used additives.

The term, "two-component systems", as used in connection with this invention, refers to thermosetting reaction systems consisting of a resin component, which contains a cross-linkable resin dissolved in suitable solvents, plus additives such as pigments, dyes, fillers, etc., and a hardener component which contains a cross-linking agent dissolved in suitable solvents.

It is known to use aliphatic amines, aromatic amines, polyaminoamides or carboxylic acid anhydrides, for example, as hardeners for thermosetting epoxy resin reaction varnishes. The use of these conventional hardeners in accordance with the state of the art results in varnish films or coatings which leave much to be desired as regards adherence, elasticity and chemical resistance as well as thermal stability and resistance to aging. Also, these reaction systems require relatively high setting temperatures and long curing time, and yellowing is encountered, especially in the case of light shades of color.

It was the aim of the present invention to find suitable cross-linking agents for the above-named epoxy resin reaction systems, whose use as a hardener component would not produce the above-described disadvantages.

THE INVENTION

It has now surprisingly been found that epoxy resin reaction systems can be obtained without the described disadvantages by using special cyclic amidines as hardening components.

The subject matter of the invention is therefore a method of producing coatings on the basis of two-component systems composed of 1,2-epoxy compounds having at least one 1,2-epoxy group in the molecule, plus cyclic amidines and the conventional paint additives, which are thermosetting at 100° to 200° C., the said method being characterized in that one uses as cyclic amidines imidazoline or tetrahydropyrimidine derivatives of the general formula

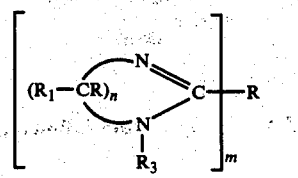

in which $n = 2$ or 3, $m = 1$ or 2, $R_1$, $R_2$ and $R_3$ are identical or different, and represent hydrogen, alkyl, aryl, aralkyl, cycloalkyl, heterocyclics, ether, theoether, halogen, —N(R)$_2$, nitro groups, keto groups, ester groups, or carbonamide groups, and R represents alkyl, alkylene, an aryl, aralkyl, cycloalkyl or heterocyclic radical, substituted if desired with halogen, nitro groups, alkyl groups, alkoxy groups or amino groups, and, when $m = 1$, represents also hydrogen, a plurality of radicals being able to be joined, also by hetero atoms such as O, N or S, if desired.

The above-described imidazoline and tetrahydropyrimidine derivatives are used in amounts of especially 10 to 90 wt.-%, preferably 40 to 70 wt.-%, with reference to the resin-and-hardener system. Under certain circumstances the addition of lesser or greater amounts may also be advantageous.

Appropriate amidines in the meaning of the present invention, which correspond to the previously given general formula, are for example: 2-phenylimidazoline, 2-phenyl-4-methylimidazoline, 2-(m-tolyl)-4-methylimidazoline, 2-(m-pyridyl)-imidazoline, 1,4-tetramethylene-bis-(4-methylimidazoline-2), 2-methylimidazoline, 2,4-dimethylimidazoline, 2-ethylimidazoline, 2-ethyl-4-methylimidazoline, 2-benzylimidazoline, 2-(o-tolyl)-imidazoline, 2-(p-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3,-trimethyl-1,4-tetramethylene-bis-4-methylimidazoline, 1,2-phenylene-bis-imidazoline, 1,3-phenylene-bis-4-methylimidazoline, 2-ethyl-1,4,5,6-tetrahydropyrimidine, 2-benzyl-1,4,5,6-tetrahydropyrimidine, etc. Mixtures of the imidazoline or tetrahydropyrimidine derivatives may also be used in accordance with the invention.

The imidazoline or tetrahydropyrimidine derivatives which may be used in accordance with the invention can be prepared by known methods from substituted or unsubstituted geminal diamines and aliphatic or aromatic mononitriles or dinitriles in the presence of elemental sulfur or sulfuryl chloride as catalyst.

Of the great number of epoxy compounds which can be reacted with the compounds of the invention the following are cited: the epoxides of mono- or poly-unsaturated hydrocarbons: ethylene, propylene, butylene, butadiene, cyclohexene, vinylcyclohexene, dicyclopentadiene, cyclododecatriene, polybutadienes, styrene: halogenous epoxides, such as epichlorhydrine; epoxy ethers of the simple alcohols: methyl alcohol, ethyl alcohol, butyl alcohol, 2-ethylhexyl alcohol; epoxy ethers of polyvalent alcohols: ethylene, propylene and butylene glycol, polyglycols, glycerine, pentaerythritol; epoxy ethers of univalent and polyvalent phenols: phenol, cresol, resorcinol, hydroquinone, 4,4'-dihydroxydiphenyl, 4,4'-dihydroxydiphenylmethane, 2,2-bis-(4-hydroxyphenyl)-propane, 4,4'-dihydroxydiphenylsulfone, phenol-formaldehyde condensation products; epoxides containing nitrogen: N,N-diglycidylaniline, N,N'-dimethyldiglycidyl-4,4'-diaminodiphenylmethane. Those which have more than one epoxy group in the molecule are preferred.

Mixtures of the epoxy compounds can be reacted just as well as the single compounds by the method of the invention, such as mixtures of mono- and polyepoxides for example.

In epoxy resins are, in a known manner, dissolved in suitable solvents and combined with the commonly used additives, such as pigments, dyes, fillers, etc., and they form the so-called "resin component." Suitable solvents for this purpose are, for example, ketones, aromatics, alcohols, glycols and the like.

The amidines used in accordance with the invention are likewise dissolved in a known manner in appropriate solvents, and they form the so-called "hardener component." Suitable solvents for this purpose are, for example, aliphatic alcohols, ketones, aromatics, esters, and the like.

The two components can easily be prepared in the cold state. After the two components are combined, the pot life of the reaction systems thus obtained is at least a week at room temperature. After application, the coatings are set for 20 to 120 minutes at 100° to 200° C., preferably for 30 minutes at 150° C.

The reaction systems prepared by the use of the described method produce coatings and paints having valuable properties, such as for example high gloss and excellent chemical resistance as well as thermal stability and resistance to aging. Their great resistance to stresses such as shock, bending and scratching are particularly worthy of note.

It has furthermore been found that an important technical advance is accomplished in that, when the amidines of the invention are used as hardeners in epoxy resin reaction systems, the required setting temperatures and times are substantially lower and shorter, respectively, than in the case of epoxy resin systems formulated with conventional hardeners. This forestalls yellowing of the paint films, since the margin between the setting temperature and the yellowing temperature is wider than it is when conventional hardeners are used.

Furthermore, it is possible to formulate the substances in accordance with the invention together with vinyl plastisols in the form of suspensions or dispersions with the epoxy resins to make valuable coatings.

The application of the reaction systems to the articles to be coated is performed by known methods, e.g., by brushing, spraying, dipping, etc.

EXAMPLES

The method of the invention is illustrated by the following examples:

General Description of the Procedure

The 1,2-epoxy compounds used, referred to in practice as "epoxy resins," were dissolved in suitable solvents and intimately mixed with amidines of the invention, likewise dissolved in suitable solvents, in the stated ratios by weight. These reaction systems were applied with a brayer to a steel plate and then set at the stated times and temperatures. The characteristics of these unpigmented, clear varnishes were determined in order to compare the coatings obtained.

EXAMPLE 1

2-phenylimidazoline was combined with an epoxy resin according to the following formulation:

| | | |
|---|---|---|
| Resin component: epoxy resin, i.e., a diglycidylether of 2,2-bis-(4-hydroxyphenyl)-propane, having an epoxy value of 0.51 to 0.58 | | 22.4 wt.-% |
| Toluene | | 30.0 wt.-% |
| Hardener component: 2-phenylimidazoline | | 17.6 wt.-% |
| Isopropanol | | 30.0 wt.-% |
| | | 100.0 wt.-% |

This formulation was applied to test specimens and tested with the following results:

| | | |
|---|---|---|
| Wet film thickness | μm | 100 |
| Setting time | min | 30 |
| Setting temperature | °C | 150 |
| Dry film thickness | μm | 20 |
| Criss-cross slash test DIN 53,151 | Class | 0 |
| Buchholz hardness DIN 53,153 | — | 111 |
| Shot blast test DIN 53,154 | — | A |
| Erichsen cupping test DIN 53,156 | mm | 8.0 |
| Pendulum hardness DIN 53,157 | sec | 228 |
| Ball impact test, Gardner | in/lb | 80 |
| Lead pencil test, Wolff-Wilborn | — | H |

EXAMPLE 2

The formulation of Example 1 was applied to test pieces and, after hardening, was subjected to aging (5 hours at 80° C.).

| | | |
|---|---|---|
| Wet film thickness | μm | 100 |
| Setting time | min | 30 |
| Setting temperature | °C | 150 |
| Dry film thickness | μm | 20 |
| Buchholz hardness | — | 111 |
| Aging | h | 5 |
| | °C | 80 |
| Buchholz hardness | — | 111 |

EXAMPLE 3

2-phenyl-4-methyl-imidazoline was formulated with the epoxy resin of Example 1:

| | | |
|---|---|---|
| Resin component: | Epoxy resin | 21.5 wt.-% |
| | Toluene | 30.0 wt.-% |
| Hardener component: | 2-phenyl-4-methyl-imidazoline | 18.5 wt.-% |
| | Isopropanol | 30.0 wt.-% |
| | | 100.0 wt.-% |
| Wet film thickness | μm | 100 |
| Setting time | min | 60 |
| Setting temperature | °C | 100 |
| Dry film thickness | μm | 15 |
| Varnish surface: | Bubbles | none |
| | Orange peel | none |
| | Gloss | very good |
| | Leveling | very good |
| Resistance to acetone | | resistant |
| Criss-cross slash test | (DIN 53,151) | Class 0 |
| Buchholz hardness | (DIN 53,153) | 125 |

EXAMPLE 4

2-(m-tolyl)-4-methylimidazoline was formulated with the epoxy resin of Example 1:

| | | |
|---|---|---|
| Resin component: | Epoxy resin | 21.6 wt.-% |
| | Toluene | 30.0 wt.-% |
| Hardener component: | 2-(m-tolyl)-4-methyl-imidazoline | 18.4 wt.-% |
| | Isopropanol | 30.0 wt.-% |
| | | 100.0 wt.-% |

The results obtained were the following:

| | | |
|---|---|---|
| Wet film thickness | μm | 100 |
| Setting time | min | 30 |
| Setting temperature | °C | 150 |
| Dry film thickness | μm | 20 |
| Varnish surface: | Bubbles | none |
| | Orange peel | none |
| | Gloss | very good |
| | Leveling | Very good |
| Resistance to acetone | | resistant |
| Criss-cross slash test (DIN 53,151) | Class | 0 |
| Buchholz hardness (DIN 53,153) | | 143 |

EXAMPLE 5

2-(m-pyridyl)-imidazoline was formulated with the epoxy resin of Example 1:

| Resin component: | Epoxy resin | | 16.5 wt.-% |
| --- | --- | --- | --- |
| | Toluene | | 20.0 wt.-% |
| Hardener component: | 2-(m-pyridyl)-imidazoline | | 23.5 wt.-% |
| | Isopropanol | | 40.0 wt.-% |
| | | | 100.0 Wt.-% |

The results obtained were the following:

| Wet film thickness | | μm | 100 |
| --- | --- | --- | --- |
| Setting time | | min | 30 |
| Setting temperature | | °C | 150 |
| Dry film thickness | | μm | 25 |
| Varnish surface: | Bubbles | — | none |
| | Orange peel | | none |
| | Gloss | | very good |
| | Leveling | | good |
| Resistance to acetone | | | Resistant |
| Criss-cross slash test (DIN 53,161) | | Class | 2 |
| Buchholz hardness (DIN 53,153) | | | 118 |

EXAMPLE 6

1,4-Tetramethylene-bis-(4-methylimidazoline-2) was formulated with the epoxy resin of Example 1:

| Resin component: | Epoxy resin | 22.9 wt.-% |
| --- | --- | --- |
| | Toluene | 30.0 wt.-% |
| Hardener component: | 1,4-tetramethylene-bis- | |
| | (4-methylimidazoline-2) | 17.1 wt.-% |
| | Isopropanol | 30.0 wt.-% |
| | | 100.0 wt.-% |

The results obtained were the following:

| Wet film thickness | | μm | 100 |
| --- | --- | --- | --- |
| Settting time | | min | 30 |
| Setting temperature | | °C | 150 |
| Dry film thickness | | μm | 25 |
| Varnish surface: | Bubbles | | none |
| | Orange peel | | none |
| | Gloss | | very good |
| | Leveling | | good |
| Resistance to acetone | | | resistant |
| Criss-cross slash test (DIN 53,151) | | Class | 1 |
| Buchholz hardness (DIN 53,153) | | | 125 |

EXAMPLE 7

2-Ethyl-1,4,5,6-tetrahydropyrimidine was formulated with the epoxy resin of Example 1:

| Resin component: | Epoxy resin | 14.0 wt.-% |
| --- | --- | --- |
| | Toluene | 20.0 wt.-% |
| Hardener component: | 2-ethyl-1,4,5,6-tetra- | |
| | hydropyrimidine | 26.0 wt.-% |
| | Isopropanol | 40.0 wt.-% |
| | | 100.0 wt.-% |

The results obtained were the following:

| Wet film thickness | | μm | 100 |
| --- | --- | --- | --- |
| Setting time | | min | 30 |
| Setting temperature | | °C | 150 |
| Dry film thickness | | μm | 10 |
| Varnish surface: | Bubbles | | none |
| | Orange peel | | none |
| | Gloss | | very good |
| | Leveling | | very good |
| Resistance to acetone | | | resistant |
| Criss-cross slash test (DIN 53,151) | | Class | 1 |
| Buchholz hardness (DIN 53,153) | | | 83 |

EXAMPLE 8

2-Benzyl-1,4,5,6-tetrahydropyrimidine was formulated with the epoxy resin of Example 1:

| Resin component: | Epoxy resin | 12.6 wt.-% |
| --- | --- | --- |
| | Toluene | 30.0 wt.-% |
| Hardener component: | 2-benzyl-1,4,5,6-tetra- | |
| | hydropyrimidine | 27.4 wt.-% |
| | Isopropanol | 30.0 wt.-% |
| | | 100.0 wt.-% |

The results obtained were the following:

| Wet film thickness | | μm | 100 |
| --- | --- | --- | --- |
| Setting time | | min | 60 |
| Setting temperature | | °C | 150 |
| Dry film thickness | | μm | 15 |
| Varnish surface: | Bubbles | | none |
| | Orange peel | | none |
| | Gloss | | very good |
| | Leveling | | very good |
| Resistance to acetone | | | resistant |
| Criss-cross slash test (DIN 53,151) | | Class | 2 |
| Buchholz hardness (DIN 53,153) | | | 100 |

EXAMPLE 9

2-Phenylimidazoline was combined with an epoxy resin in the following formulation:

| Resin component: | Epoxy resin, i.e., a diglycidyl ether of 2,2-bis-(4-hydroxyphenyl)-propane with an epoxy value of 0.50 to 0.55: | 22.6 wt.-% |
| --- | --- | --- |
| | Toluene: | 30.0 wt.-% |
| Hardener component: | 2-phenyl-imidazoline: | 17.4 wt.-% |
| | Isopropanol: | 30.0 wt.-% |
| | | 100.0 wt.-% |

The results obtained were as follows:

| Wet film thickness | | μm | 100 |
| --- | --- | --- | --- |
| Setting time | | min | 30 |
| Setting temperature | | °C | 150 |
| Dry film thickness | | μm | 15 |
| Varnish surface: | Bubbles | | none |
| | Orange peel | | none |
| | Gloss | | very good |
| | Leveling | | very good |
| Resistance to acetone | | | resistant |
| Criss-cross slash test (DIN 53,151) | | Class | 0 |
| Buchholz hardness (DIN 53,153) | | | 125 |

EXAMPLE 10

2-Phenylimidazoline was combined with an epoxy resin in the following formulation:

| Resin component: | Epoxy resin based on aliphatic polyols, with an epoxy value of 0.60 to 0.64: | 21.0 wt.-% |
| --- | --- | --- |
| | Toluene: | 30.0 wt.-% |
| Hardener component: | 2-Phenylimidazoline: | 19.0 wt.-% |
| | Isopropanol: | 30.0 wt.% |
| | | 100.0 wt.-% |

The results obtained were as follows:

| Wet film thickness | | μm | 100 |
| --- | --- | --- | --- |
| Setting time | | min | 30 |
| Setting temperature | | °C | 150 |
| Dry film thickness | | μm | 15 |
| Varnish surface: | Bubbles | | none |
| | Orange peel | | none |

| | | | |
|---|---|---|---|
| Gloss | | | good |
| Leveling | | | very good |
| Resistance to acetone | | | resistant |
| Criss-cross slash test (DIN 53,151) | | Class | 0 |
| Buchholz hardness (DIN 53,153) | | | 143 |

EXAMPLE 11

2-Phenylimidazoline was combined with an epoxy resin in the following formulation:

| | | |
|---|---|---|
| Resin component: | Epoxy resin, i.e., a diglycide ether of 4,4'-dihydroxydiphenyl-dimethylmethane with an epoxy value of 0.52: | 22.6 wt.-% |
| | Toluene: | 30.0 wt.-% |
| Hardener component: | 2-phenylimidazoline 17.4 wt.-% Isopropanol: | 30.0 wt.-% |
| | | 100.0 wt.-% |

The results obtained were as follows:

| | | | |
|---|---|---|---|
| Wet film thickness | | μm | 100 |
| Setting time | | min | 30 |
| Setting temperature | | °C | 150 |
| Dry film thickness | | μm | 15 |
| Varnish surface: | Bubbles | | none |
| | Orange peel | | none |
| Gloss | | | very good |
| Leveling | | | very good |
| Resistance to acetone | | | resistant |
| Criss-cross slash test (DIN 53,151) | | Class | 0 |
| Buchholz hardness (DIN 53,153) | | | 125 |

What is claimed is:

1. In a method for making coatings by the elevated temperature reaction of a mixture consisting essentially of a hardener, conventional varnish additives and 1,2-epoxy compounds having at least one 1,2-epoxy group in the molecule, said mixture being dissolved in an organic solvent selected from the group of ketones, alcohols, aromatics and esters, the improvement which consists essentially of using as the hardener a cyclic amidine selected from the group consisting of 2-ethyl-1,4,5,6-tetrahydropyrimidine and 2-benzyl-1,4,5,6tetrahydropyrimidine.

2. Method of claim 1 wherein the cyclic amidine is used in amounts of 10 to 90 weight percent, preferably 40 to 70 weight percent, based on the amount of hardener and epoxy compound.

3. A method according to claim 1 wherein the hardening is conducted at a temperature of 100° to 200° C.

4. A method according to claim 1 wherein the cyclic amidine is 2-ethyl-1,4,5,6-tetrahydropyrimidine.

5. A method according to claim 1 wherein the cyclic amidine is 2-benzyl-1,4,5,6-tetrahydropyrimidine.

* * * * *